(12) United States Patent
Jenkins

(10) Patent No.: US 7,464,371 B2
(45) Date of Patent: Dec. 9, 2008

(54) COMPUTER-IMPLEMENTED METHOD, SYSTEM AND PROGRAM PRODUCT FOR ANALYZING MESSAGES ASSOCIATED WITH COMPUTER PROGRAM CODE

(75) Inventor: Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/685,806

(22) Filed: Oct. 15, 2003

(65) Prior Publication Data

US 2005/0086233 A1    Apr. 21, 2005

(51) Int. Cl.
G06F 9/44    (2006.01)

(52) U.S. Cl. .................. 717/123; 717/101; 717/107; 704/2

(58) Field of Classification Search ............. 717/110, 717/124, 121, 123, 107, 101; 707/6; 704/2
See application file for complete search history.

(56) References Cited

U.S. PATENT DOCUMENTS

| | | | |
|---|---|---|---|
| 5,287,444 A | | 2/1994 | Enescu et al. |
| 5,752,242 A * | | 5/1998 | Havens ..................... 707/3 |
| 5,909,570 A | | 6/1999 | Webber |
| 6,256,676 B1 | | 7/2001 | Taylor et al. |
| 6,609,128 B1 | | 8/2003 | Underwood |
| 6,993,472 B2 * | | 1/2006 | Redpath ..................... 704/2 |
| 7,152,222 B2 * | | 12/2006 | Kumhyr et al. ............. 717/107 |
| 2002/0120918 A1 | | 8/2002 | Aizenbud-Reshef et al. |
| 2003/0236992 A1 * | | 12/2003 | Yami ..................... 713/200 |

OTHER PUBLICATIONS

"Java and WebSphere Performance", IBM Redbooks, Feb. 2002, chapters 1-3 extracted (70 pages). [Online] [Retrieved at] <www.redbooks.ibm.com/redbooks/pdfs/sg246256.pdf>.*
"Collecting and Analyzing PEX Trace Profile Data", IBM Rochester Lab, Sep. 2002 (4 pages). [Online] [Retrieved at] <www-03.ibm.com/servers/eserver/iseries/perfmagmt/pdf/tprof.pdf>.*

* cited by examiner

Primary Examiner—Tuan Q. Dam
Assistant Examiner—Thuy Dao
(74) Attorney, Agent, or Firm—Bruce Clay; Hoffman Warnick LLC

(57) ABSTRACT

An analysis criteria for indentifying computer program components, properties files and a predetermined time period so that specific messages can be identified. Thereafter, desired information is designated. Typical types of desired information include a quantity and an estimated line count for certain types of messages (e.g., newly created, edited and/or deleted). Once this is designated, instances of the types of messages (e.g., specific messages fitting the designated types) will be identified using the analysis criteria, and then analyzed to determine the desired information. The estimated line count can be used to estimate translation costs for the messages.

20 Claims, 5 Drawing Sheets

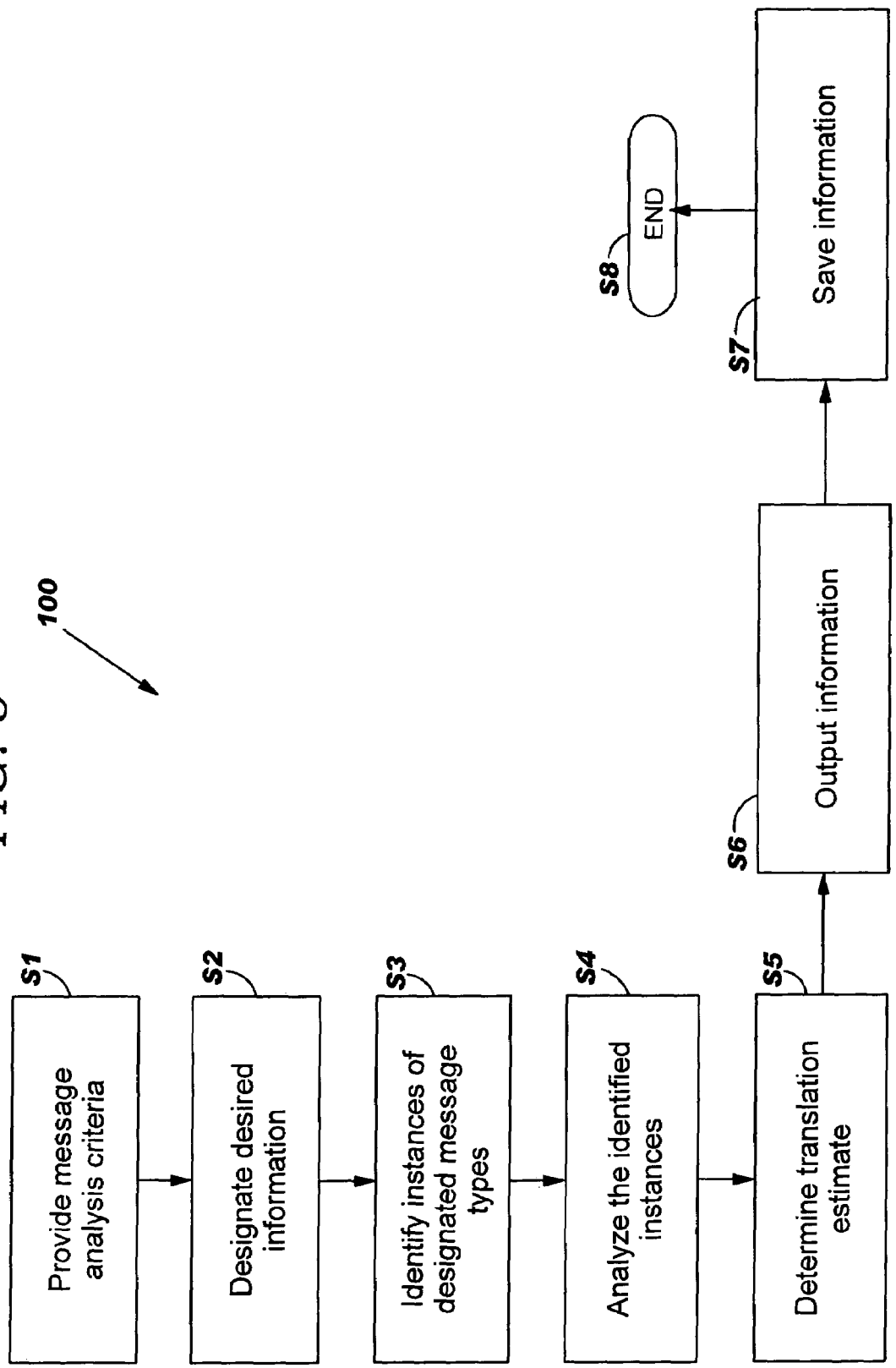

COMPUTER-IMPLEMENTED METHOD, SYSTEM AND PROGRAM PRODUCT FOR ANALYZING MESSAGES ASSOCIATED WITH COMPUTER PROGRAM CODE

This application is related in some aspects to co-pending U.S. application Ser. No. 10/681,908, filed Oct. 9, 2003 and entitled "Computer-Implemented Method, System and Program Product for Determining a Message Quantity for Program Code," and to co-pending U.S. application Ser. No. 10/681,910, filed Oct. 9, 2003 and entitled "Computer-Implemented Method, System and Program Product for Reviewing a Message Associated with Computer Program Code."

CROSS-REFERENCE TO RELATED APPLICATIONS

This application is related to co-pending application entitled "Computer-implemented Method, System and Program Product for Determining a Message Quantity for Computer Program Code," filed Oct. 9, 2003 and assigned, and to co-pending application entitled "Computer-implemented Method, System and Program Product for Reviewing a Message Associated with Computer Program Code," filed Oct. 9, 2003 and assigned, both of which are herein incorporated by reference.

BACKGROUND OF THE INVENTION

1. Field of the Invention

The present invention generally relates to a computer-implemented method, system and program product for analyzing messages associated with computer program code. Specifically, the present invention determines information/metrics corresponding to the messages so that translation estimates can be computed.

2. Related Art

As computers continue to become more integrated in everyday life, computer software continues to become more sophisticated. For example, today a computer user can prepare a tax return, pay bills, purchase goods or services, etc., from the comfort of his/her personal computer. Such convenience is provided by various software packages. To this extent, computer program developers are constantly working to improve existing products, or introduce new products to the market.

In developing computer program code, a developer will usually include certain "messages" in properties files that are designed to support the product for the end-user. Typical messages that can be provided include error messages, warning messages and information messages. Although each of these messages serves a different purpose, they are usually necessary to fully support the program code being developed. Unfortunately, there is currently no way for developers to readily determine information about the messages. Specifically, since messages are constantly being created, edited or deleted, there is very little way to know specific details about the messages. For example, a developer might wish to know the quantity of new messages that were created during a fixed time period, and the quantity of lines of new content that were included. Such details are especially difficult to ascertain given the large volume of program code components and properties files that can be involved with a single product.

As a result of this predicament, program integrated information (PII) counts are usually inaccurate and highly inflated to try to accommodate some unknown number. This raises various concerns since translation between languages is often necessary for a program. Specifically, it is common for a software product to be made available in multiple countries/regions of the world. As such, lingual translation of interfaces, messages and the like is necessary. The longer the messages that are utilized to support a program, the greater the translation costs. Thus, with no knowledge of the amount of content to be translated as messages are created, edited or deleted, translations costs are virtually impossible to accurately predict.

In view of the foregoing, there exists a need for a computer-implemented method, system and program product for analyzing messages associated with computer program code. Specifically, a need exists for a system that can be configured to analyze certain types of messages. A further need exists for the system to be configured to return certain pieces of desired information about the messages. A further need exists for the system to be able to determine an estimated line count within the analyzed messages.

SUMMARY OF THE INVENTION

In general, the present invention provides a computer-implemented method, system and program product for analyzing messages. Specifically, under the present invention, an analysis criteria is provided. The criteria identifies computer program components, properties files and a predetermined time period so that specific messages can be identified. Thereafter, information desired to be obtained about the messages is designated. Typical types of desired information include a quantity and an estimated line count for certain types of messages (e.g., newly created, edited and/or deleted). Once this is designated, instances of the types of messages (e.g., specific messages fitting the designated types) will be identified using the analysis criteria, and then analyzed to determine the desired information. The estimated line count can be used to estimate translation costs for the messages.

A first aspect to the present invention provides a method for analyzing messages associated with computer program code, comprising: providing message analysis criteria for analyzing messages crafted in natural language for an end user of a computer program, wherein the message analysis criteria identifies at least one computer program component, at least one properties file and a predetermined time period to identify specific messages for analysis, wherein the message analysis criteria is designated through a criteria interface, wherein the message analysis criteria determines lingual metrics corresponding to the messages for computing estimates of lingual translations of each of the messages; designating desired information, wherein the desired information includes a message quantity and an estimated line count for at least one type of message, wherein the desired information is designated through an information request interface; and identifying instances of the at least one type of message based on the analysis criteria, and analyzing the instances to determine the desired information.

A second aspect to the present invention provides a computer implemented system, embodied in a computer readable, recordable, and executable medium, for analyzing messages associated with computer program code, the system comprising: a criteria system for providing message analysis criteria, for analyzing messages crafted in natural language for an end user of a computer program, wherein the message analysis criteria identifies at least one computer program component, at least one properties file and a predetermined time period to identify specific messages for analysis, wherein the message analysis criteria is designated through a criteria interface, wherein the message analysis criteria determines lingual metrics corresponding to the messages for computing estimates of lingual translations of each of the messages; an information request system for designating desired information, wherein the desired information includes a message quantity and an estimated line count for at least one type of message, wherein the desired information is designated through an information request interface; and an analysis system for identifying instances of the at least one type of message based on the analysis criteria, and for analyzing the instances to determine the desired information; and an output system for outputting the desired information.

A third aspect to the present invention provides a program product stored on a recordable medium for analyzing messages associated with computer program code, which when executed, comprises: program code for providing message analysis criteria for analyzing messages crafted in natural language for an end user of a computer program, wherein the message analysis criteria identifies at least one computer program component, at least one properties file and a predetermined time period to identify specific messages for analysis, wherein the message analysis criteria is designated through a criteria interface, wherein the message analysis criteria determines lingual metrics corresponding to the messages for computing estimates of lingual translations of each of the messages; program code for designating desired information, wherein the desired information includes a message quantity and an estimated line count for at least one type of message, wherein the desired information is designated through an information request interface; and program code for identifying instances of the at least one type of message based on the analysis criteria, and for analyzing the instances to determine the desired information.

Therefore, the present invention provides a computer-implemented method, system and program product for analyzing messages.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a flow diagram of a method for analyzing messages associated with computer program code according to the present invention.

Figure 1:
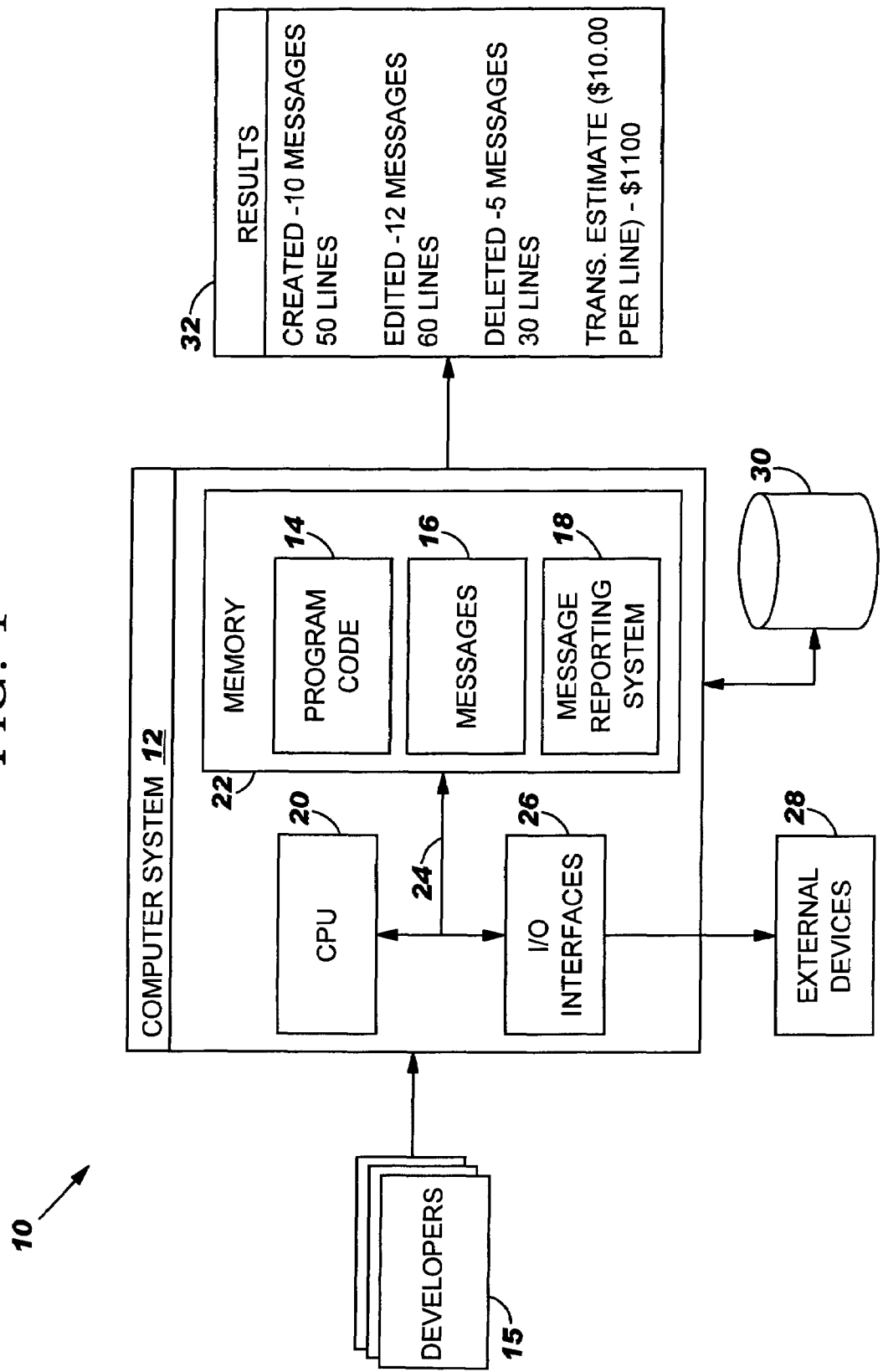
FIG. 1 depicts a system for analyzing messages associated with computer program code according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a computer-implemented method, system and program product for analyzing messages. Specifically, under the present invention, an analysis criteria is provided. The criteria identifies computer program components, properties files and a predetermined time period so that specific messages can be identified. Thereafter, information desired to be obtained about the messages is designated. Typical types of desired information include a quantity and an estimated line count for certain types of messages (e.g., newly created, edited and/or deleted). Once this is designated, instances of the types of messages (e.g., specific messages fitting the designated types) will be identified using the analysis criteria, and then analyzed to determine the desired information. The estimated line count can be used to estimate translation costs for the messages.

Referring now to FIG. 1, system 10 for analyzing messages associated with computer program code is shown. As depicted, system 10 includes a computer system 12 that contains computer program code 14 (hereinafter simply referred to as "program code 14") and messages 16 as developed by one or more developers 15. As will be further described below, message reporting system 18 is an executable program or the like that analyzes messages 16 based upon analysis criteria to determine desired information. Typically, the desired information includes a quantity and an estimated line count for at least one type of messages. This information is useful in computing an estimated translation cost for newly created or edited messages.

It should be understood that computer system 12 is intended to represent any type of computerized device capable of executing programs and performing the functions described herein. For example, computer system 12 could be a personal computer, a handheld device, a workstation, client, server, etc. In addition, computer system 12 could be implemented as a stand-alone system, or as part of a computerized network such as the Internet, local area network (LAN), wide area network (WAN), virtual private network (VPN), etc. In the case of the former, program code 14 and messages 16 could be provided to computer system 12 on a recordable medium such as a diskette or CD-ROM (e.g., by a developer 15). In the case of the latter, program code 14 and messages 16 could be made available to computer system 12 over a network (e.g., via e-mail, file sharing, etc.). Furthermore, if implemented within a network, computer system 12 could represent a client or a server. As known, communication between clients and a server could occur via a direct hard-wired connection (e.g., serial port), or via an addressable connection that may utilize any combination of wireline and/or wireless transmission methods. The server and the clients may utilize conventional network connectivity, such as Token Ring, Ethernet, WiFi or other conventional communications standards. Moreover, connectivity could be provided by conventional TCP/IP sockets-based protocol. In this instance, the clients could utilize an Internet service provider to establish connectivity to the server.

Regardless of its implementation, as shown computer system 12 comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and computer system. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, handheld device, keyboard, mouse, voice recognition system, speech output system, printer, monitor/display, facsimile, pager, etc. Bus 24 provides a communication link between each of the components in server 14 and likewise may comprise any known type of transmission link, including electrical, optical, wireless, etc.

Storage unit 30 can be any system (e.g., database) capable of providing storage for information under the present invention. Such information could include, for example, program code, messages, translation costs, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Furthermore, although not shown, additional components, such as cache memory, communication systems, system software, etc., may be incorporated into computer system 12.

As indicated above, message reporting system 18 will analyze messages 16 that are associated with program code 14, and provide desired/requested information. Specifically, message reporting system 18 is capable of determining a quantity of messages created, edited and/or deleted, as well as an estimated line count for each such message type. This information can be displayed to developers 15 or the like in result interface 32.

Figure 2:
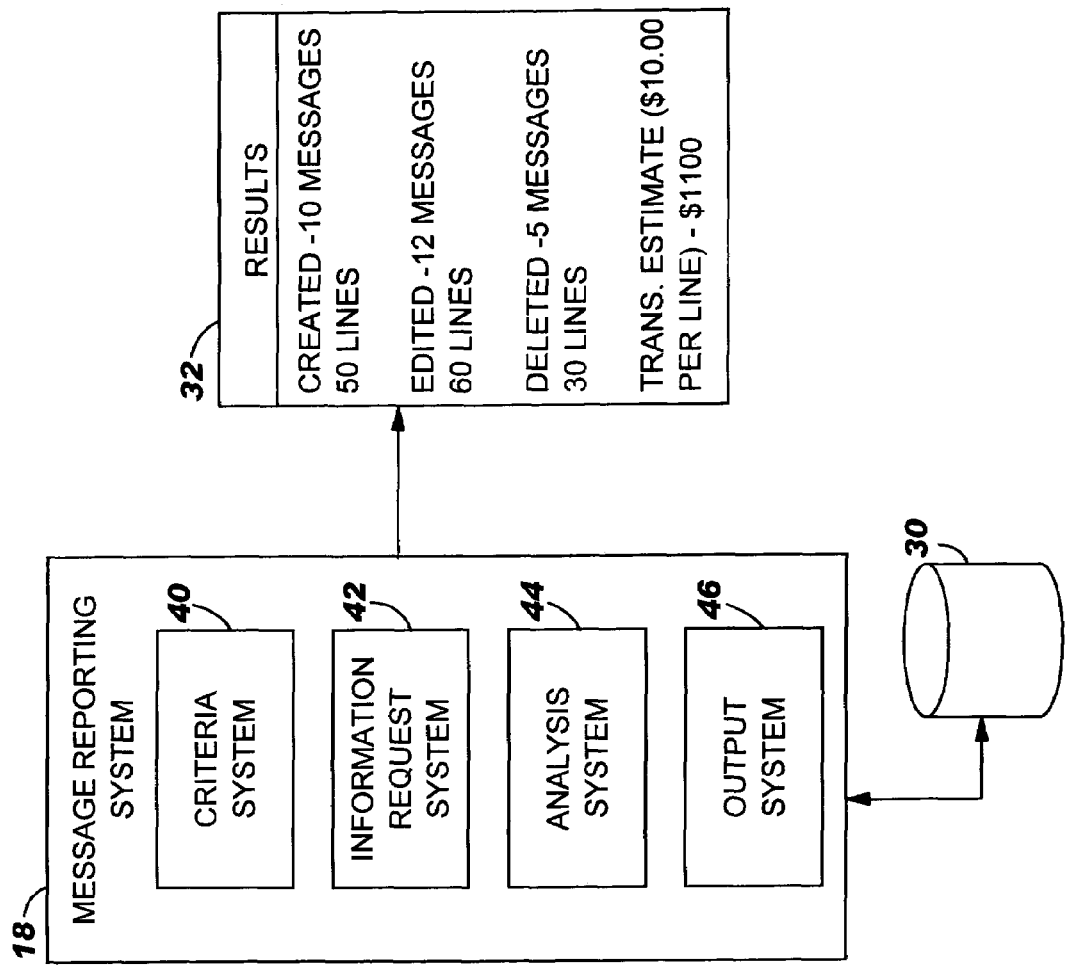
FIG. 2 depicts the message reporting system of FIG. 1.
Figure 3:
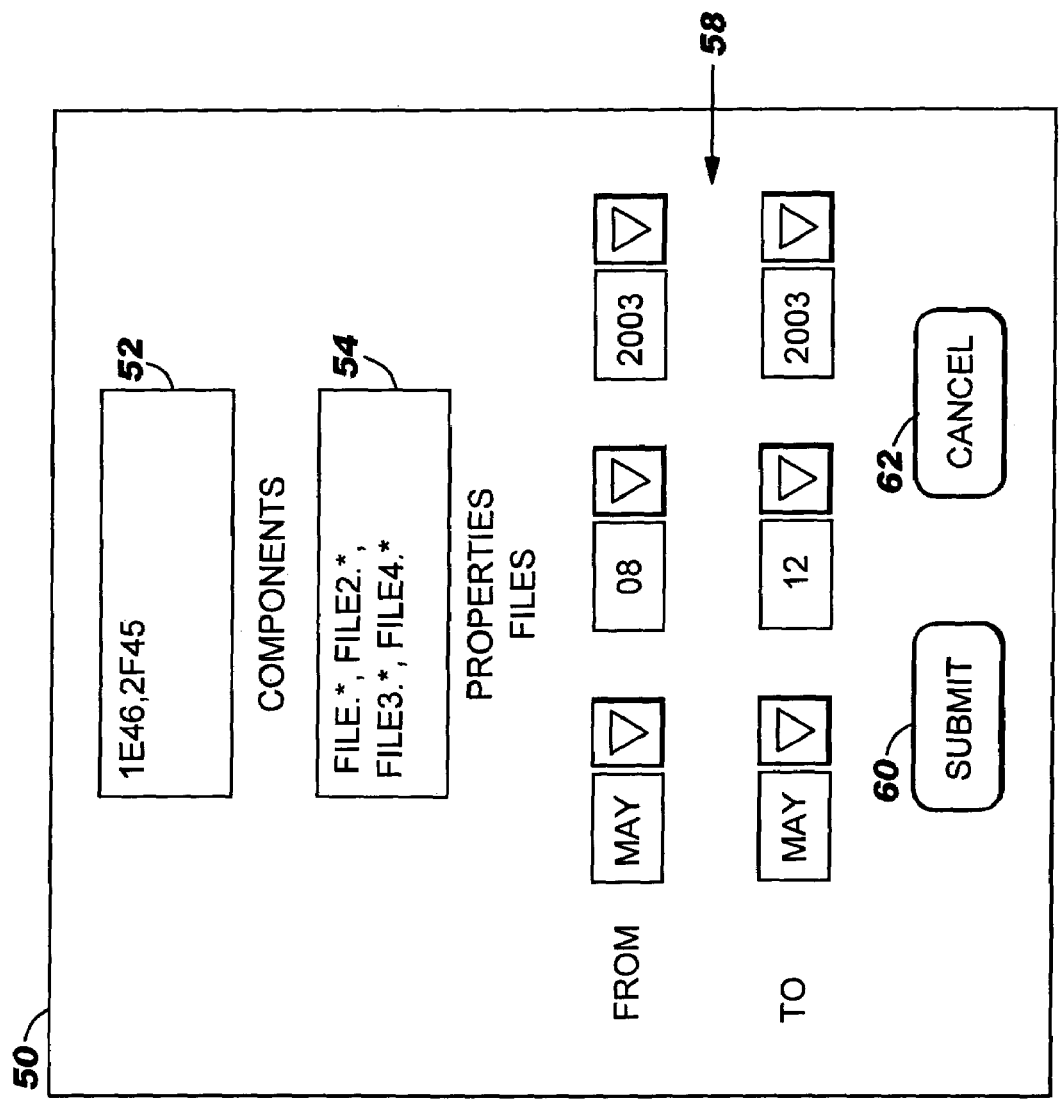
FIG. 3 depicts an illustrative criteria interface, according to the present invention.

Referring now to FIG. 2, message reporting system 18 is shown in greater detail. As depicted, message reporting system 18 includes criteria syste 40, information request system 42, analysis system 44 and output system 46. Criteria system 40 provides the mechanism by which message analysis criteria will be provided. Specifically, criteria system 40 typically generates a criteria interface through which developers 15 or the like can designate the criteria by which messages will be identified and analyzed. Referring to Figs. 3, an illustrative criteria interface 50 is shown in greater detail. In a typical embodiment, the message analysis criteria that will be provided includes at least one computer program component, at least one properties file and a predetermined time period, which can be provided using component field 52, property file field 54 and date boxes 58, respectively. This collective information identifies a specific "pool" of messages that can be subject to analysis. That is, identifying computer program components identifies particular sections of program code 14 whose associated messages 16 could be subject to analysis under the present invention. Identifying properties files identifies the precise files corresponding to the identified computer program components in which actual meaasges are located. For example, a single computer program component could have ten associated properties files. However, the developer may only be interested in potentially analyzing messages from two of the ten properties files. The predetermined time period provides an exact date range of potential messages. For example, the developer might only be interested in messages that exist between certain dates. Using the illustrative information shown in FIG. 3, the developer wishes the pool of potential messages to include those associated with computer program components 1E46 and 2F45, and that are stored in properties files FILE.*, FILE2.*, FILE3.* and FILE 4*, and that exist between May 8, 2003 and May 12, 2003. If the developer is satisfied with the criteria that has been provided, he/she can select submit button 60 to finalize the same, or cancel button 62 to cancel the process.

Referring back to FIG. 2, once the developer has provided the message analysis criteria, the developer can then designate desired information via information request system 42.

Figure 4:
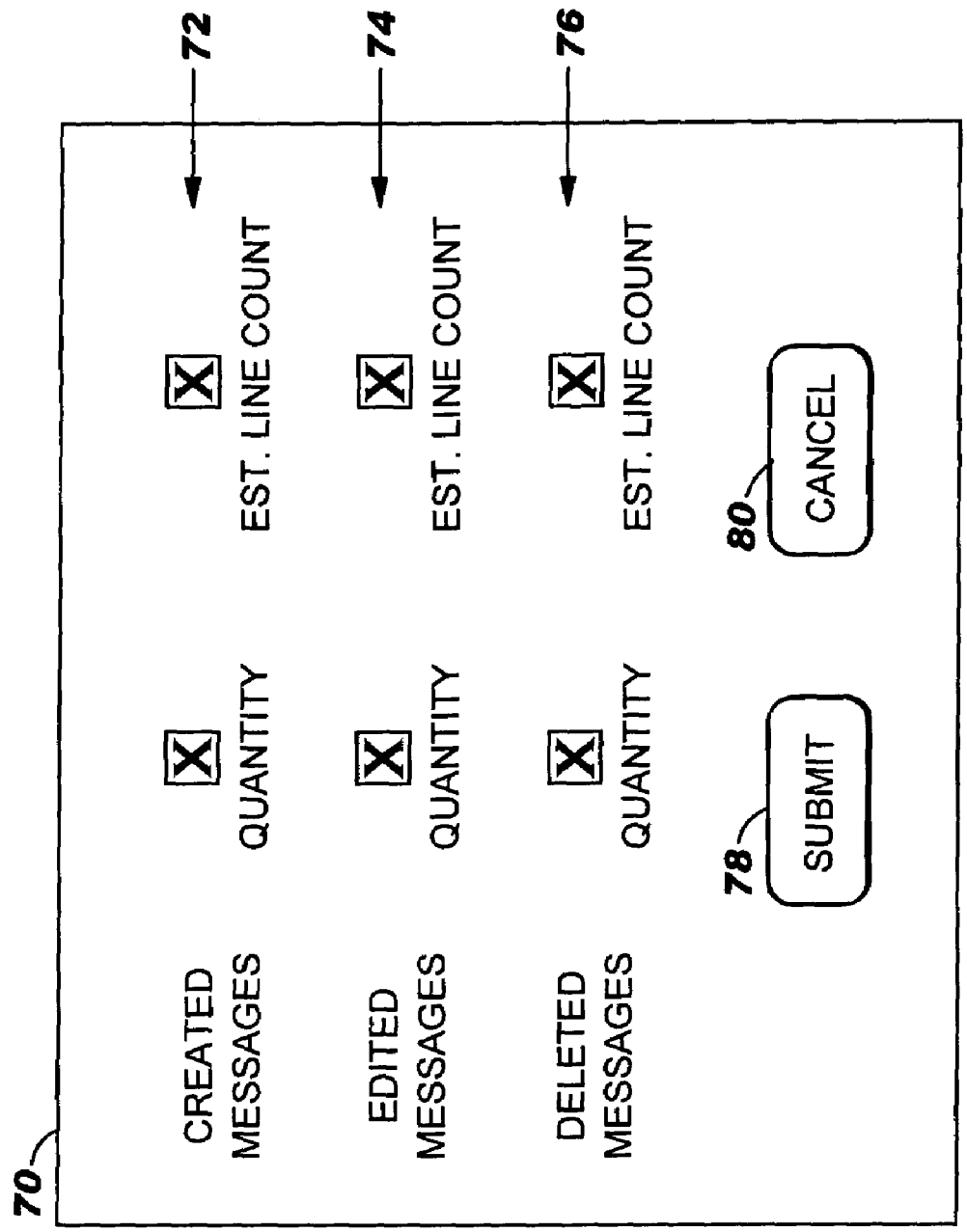
FIG. 4 depicts an illustrative information request interface according to the present invention.

Specifically, the developer will express which types of messages he/she wishes to be analyzed from the pool of messages, as well as the information he/she desires to obtain from the analysis. To this extent, information request system 42 will typically generate an information request interface. Referring to FIG. 4, an illustrative information request interface 70 is shown. In general, information request interface 70 allows the developer to designate the types of messages he/she wishes to have analyzed from the pool. Under the present invention, the possible types of messages that can be analyzed include newly created messages, edited messages and deleted messages. For each type of message, the developer has the capability to designate the information he/she desires to receive. In a typical embodiment, the developer will use check boxes 72, 74 and 76 or the like to designate whether he/she wishes to receive a quantity and an estimated line count for each type of message. For example, as shown in FIG. 4, the developer has checked both the quantity box and the estimated line count box for the "created messages" type. This means that the developer wishes to know how many new messages were created, and how many total lines of content were created for messages in the pool established by the message analysis criteria (e.g., messages associated with the identified computer program components, that are located within the identified properties files and that were created between the established date range). Similarly, both boxes being checked for the "edited messages" type means that the developer wishes to know how many messages were edited, and how many lines of content were edited in messages in the pool established by the message analysis criteria. Still yet, both boxes being checked for the "deleted messages" type means that means that the developer wishes to know how many messages were deleted, and how many lines of content were deleted from messages in the pool established by the message analysis criteria. In any event, once the developer has designated the information desired to be received, he/she can select submit button 78 to finalize the same, or cancel button 80 to cancel the process.

Referring back to FIG. 2, after the desired information has been designated, analysis system 44 will locate/identify the applicable instances of the message types for which information was desired. Specifically, analysis system 44 will obtain the instances of the message types that are associated with the identified computer program components, from the identified properties files, and that are within the established time period (date range) for which information is desired. Using the examples set forth above, analysis system 44 will obtain the instances that are associated with computer program components 1E46 AND 2F45, that are located in properties files FILE.*, FILE2.*, FILE3.* and FILE 4*, and that were created, edited or deleted between May 8, 2003 and May 12, 2003.

Once the appropriate instances/messages are identified, analysis system 44 will then analyze the same to determine the desired information. That is, analysis system 44 will determine the quantity of messages created, edited and deleted, as well as respective estimate line counts for content newly added, edited and deleted. In general, the quantities will be computed by summing the number of instances of each message type. For example, if ten messages were newly created in the pool established by the message analysis criteria, the quantity would be ten. The estimated line count is determined by computing a quantity of words, and then dividing that quantity by a predetermined number (e.g. as stored in storage unit 30). In a typical embodiment, the predetermined number is ten because it is presumed that each line of content will have approximately ten words, although it should be understood that any predetermined quantity could be used to estimate the line count. Thus, for example, if there were ten newly created messages, and a total of 500 words of newly created content, analysis system 44 would determine that there is an estimated 50 lines of new content. Similarly, if twelve messages in the designated pool were edited, and a total of 600 words of content were edited, analysis system 44 would determine that an estimated 60 lines of content had been edited. Still yet, if five messages in the designated pool were deleted, and a total of 300 words of content were deleted, analysis system 44 would determine that an estimated 30 lines of content had been deleted.

Using the estimated line count, analysis system 44 could also provide a translation estimate for newly created and edited messages. Specifically, using a predetermined translation cost, analysis system 44 could compute the translation estimate based on a quantity of words or lines that had been created or edited. Thus, for example, if the estimated translation cost is $1.00 per word or $10.00 per line (using the ten word per line predetermined value discussed above), the cost for translating the newly created content in the designated pool would be $500, while the cost for translating the edited content in messages within the designated pool would be $600. This would yield a total estimated translation cost of $1100. A translation savings or lost cost for content deleted from messages in the designated pool could be computed in a similar fashion. For example, since 30 lines of content were deleted from messages in the designated pool, it could be presumed that an estimated total of $300 had been lost since the content was no longer being used. Once all desired information has been determined by analysis system 44, output system 46 can generate result interface 32 to provide the information to the developer.

Referring now to FIG. 5, a flow diagram 100 of a method according to the present invention is shown. As depicted, first step S1 is to providing message analysis criteria. As indicated above, the message analysis criteria identifies at least one computer program component, at least one properties file and a predetermined time period. Second set S2 is to designate desired information such as a message quantity and an estimated line count for at least one type of message. Third step S3 is to identify instances of the at least one type of message based on the analysis criteria. Fourth step S4 is to analyze the instances to determine the desired information. As indicated above, the present invention could optionally provide a translation estimate in step S5 before the information is outputted in step S6, optionally saved in step S7 and the process ended in step S8.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for analyzing messages associated with computer program code, the method comprising:
   providing message analysis criteria for analyzing messages crafted in natural language for an end user of a computer program, wherein the message analysis criteria identifies at least one computer program component, at least one properties file and a predetermined time period to identify specific messages for analysis, wherein the message analysis criteria is designated through a criteria interface, wherein the message analysis criteria determines lingual metrics corresponding to the messages for computing estimates of lingual translations of each of the messages;
   designating desired information, wherein the desired information includes a message quantity and an estimated line count for at least one type of message, wherein the desired information is designated through an information request interface; and
   identifying instances of the at least one type of message based on the analysis criteria, and analyzing the instances to determine the desired information.

2. The method of claim 1, further comprising outputting the desired information.

3. The method of claim 1, further comprising computing an estimated translation cost based on the estimated line count.

4. The method of claim 1, wherein the estimated line count is computed by:
   determining a total of words added, changed or deleted within the instances; and
   dividing the total of words by a predetermined value.

5. The method of claim 4, wherein the predetermined value is ten.

6. The method of claim 1, wherein the at least one type of message is selected from the group consisting of newly created messages, edited messages and deleted messages, and wherein the instances of the at least one type of message are those that correspond to the at least one computer program component and that exist within the at least one properties file during the predetermined time period.

7. The method of claim 6, wherein the estimated line count represents a translation estimate for the newly created messages and the edited messages.

8. A computer implemented system, embodied in a computer readable, recordable, and executable medium, for analyzing messages associated with computer program code the system comprising:
   a criteria system for providing message analysis criteria for analyzing messages crafted in natural language for an end user of a computer program, wherein the message analysis criteria identifies at least one computer program component, at least one properties file and a predetermined time period to identify specific messages for analysis, wherein the message analysis criteria is designated through a criteria interface, wherein the message analysis criteria determines lingual metrics corresponding to the messages for computing estimates of lingual translations of each of the messages;

an information request system for designating desired information, wherein the desired information includes a message quantity and an estimated line count for at least one type of message, wherein the desired information is designated through an information request interface;

an analysis system for identifying instances of the at least one type of message based on the analysis criteria, and for analyzing the instances to determine the desired information; and an output system for outputting the desired information.

9. The system of claim 8, wherein the analysis system further computes an estimated translation cost based on the line count.

10. The system of claim 8, wherein the analysis system computes the estimated line count by:

determining a total of words added, changed or deleted within the instances; and dividing the total of words by a predetermined value.

11. The system of claim 10, wherein the predetermined value is ten.

12. The system of claim 8, wherein the at least one type of message is selected from the group consisting of newly created messages, edited messages and deleted messages, and wherein the instances of the at least one type of message are those that correspond to the at least one computer program component and that exist within the at least one properties file during the predetermined time period.

13. The system of claim 12, wherein the estimated line count represents a translation estimate for the newly created messages and the edited messages.

14. A program product stored on a recordable medium for analyzing messages associated with computer program code which when executed, comprises:

program code for providing message analysis criteria for analyzing messages crafted in natural language for an end user of a computer program, wherein the message analysis criteria identifies at least one computer program component, at least one properties file and a predetermined time period to identify specific messages for analysis, wherein the message analysis criteria is designated through a criteria interface, wherein the message analysis criteria determines lingual metrics corresponding to the messages for computing estimates of lingual translations of each of the messages;

program code for designating desired information, wherein the desired information includes a message quantity and an estimated line count for at least one type of message, wherein the desired information is designated through an information request interface; and program code for identifying instances of the at least one type of message based on the analysis criteria, and for analyzing the instances to determine the desired information.

15. The program product of claim 14, further comprising program code for outputting the desired results.

16. The program product of claim 14, wherein the program code for analyzing further computes an estimated translation cost based on the line count.

17. The program product of claim 14, wherein the program code for analyzing computes the estimated line count by:

determining a total of words added, changed or deleted within the instances; and dividing the total of words by a predetermined value.

18. The program product of claim 17, wherein the predetermined value is ten.

19. The program product of claim 14, wherein the at least one type of message is selected from the group consisting of newly created messages, edited messages and deleted messages, and wherein the instances of the at least one type of message are those that correspond to the at least one computer program component and that exist within the at least one properties file during the predetermined time period.

20. The program product of claim 19, wherein the estimated line count represents a translation estimate for the newly created messages and the edited messages.

* * * * *